2,874,062
PROCESS FOR THE MANUFACTURE OF STABILIZER-PLASTICIZER COMPOSITIONS

Leonard M. Kebrich, Brooklyn, and Alfred W. Stroebel, Forest Hills, N. Y., assignors to National Lead Company, New York, N. Y., a corporation of New Jersey No Drawing. Application August 22, 1955
Serial No. 529,920

5 Claims. (Cl. 106—262)

This invention relates to a process for the manufacture of flushed pastes having heat stabilizing and plasticizing properties for resinous compositions.

The term "flushed pastes" refers to pigment-vehicle paste compositions prepared by a preferential dispersion process as, for example, mixing or agitating an aqueous filter cake of a solid substance or pigment with an oily vehicle until the solid portions are dispersed in the oil phase and the aqueous phase separated from the pigment-oil paste. Such processes are highly desirable in many industrial applications. Where a flushing operation can be employed, there is an elimination of drying and grinding operations. In the event the solid substances are unstable, e. g. of an inflammable nature, there is substantially complete elimination of the fire hazard. In addition to this, there is a total elimination of the dusting problem. This latter aspect assumes considerable importance where the substances can cause severe irritations or are toxic, as is the case with some lead chemicals.

Another disadvantage involved in the usual practice of drying the filter cake by evaporation to produce a powdered product lay in the fact that any water-soluble salts present in the water-wet filter cake (which was normally about 50% solids—i. e. half water) were concentrated upon evaporation of the water and remained intimately mixed with the stabilizer. These salts thus found their way into the vinyl or other resin to which the stabilizer was added, and resulted in appreciable impairment of the electrical insulating properties of the resin. In some instances, moreover, the retained salts caused severe agglomeration of the solid particles during drying, forming agglomerates which could not be resolved by the finest dry grinding, and which impaired subsequent dispersion in liquid media.

Pigment-vehicle flushing processes have long been known to the painting arts, as exemplified by the manufacture of white lead paste in linseed oil. Not all substances, however, lend themselves to flushing processes. In some instances, the solids dispersed in one liquid medium are not preferentially wetted by the desired dispersing medium. In other instances, emulsions are formed by the liquid media which cannot be separated and which prevent the transfer of the solid substances from one liquid phase to the other. Furthermore, it has not heretofore been known that flushing techniques might be employed for the preparation of paste compositions having heat stabilizing and plasticizing properties for resinous compositions.

The principal object of this invention is to provide a novel process for the manufacture of paste compositions having heat stabilizing properties for resinous compositions.

Another object is to provide a process for the manufacture of paste compositions having heat stabilizing and plasticizing properties for resinous compositions.

A further object is to provide a process for the manufacture of flushed pastes by effecting a phase transfer of heat stabilizing substances from an aqueous medium to an organic medium.

Additional objects and advantages will become obvious from the following detailed description of the invention and the appended claims.

According to the process of the invention, an aqueous filter cake of a basic lead salt of a fatty acid containing from 6 to 22 carbon atoms is mixed or agitated with an organic vehicle, preferably a liquid plasticizer, thereby dispersing said lead salt in said organic vehicle, and the water portion of said aqueous filter cake separated from said organic vehicle and the lead salt therein dispersed. As used herein, the term "filter cake" is taken to mean an aqueous paste resulting from filtration or equivalent operations, e. g. centrifugation, settling or the like.

Basic lead salts for use as stabilizers for vinyl resins, for example dibasic lead stearate, dibasic lead caprylate and dibasic lead oleate are normally manufactured in an aqueous medium. When these salts are concentrated in a filter press, they form a semi-solid filter cake, which generally contains 50% or more of water in addition to the solid portions therein. The heretofore usual practice has been to dry this filter cake to separate the solid portions, with all of the attendant disadvantages mentioned above. Copending application Serial No. 529,919 filed August 22, 1955, discloses and claims a method for overcoming the disadvantages of the conventional practice by flushing the basic lead salt into an organic vehicle without any intermediate drying stage, the transfer from the aqueous to the organic dispersing medium being effected by the addition of small quantities of fatty acids. According to this invention, on the other hand, using the particular basic lead salts herein specified, the plasticizer vehicle may be added directly to the filter cake in a suitable container fitted with mechanical mixing means and the stabilizer flushed directly into said plasticizer (or other vehicle), no additional wetting or dispersing agent being required.

The proportion of plasticizer or other vehicle added is not critical, but it should be present in sufficient quantity to permit complete dispersion therein of the solid portion of the filter cake. This amount will generally be a weight of plasticizer that is roughly equivalent to one-third of the weight of the solid portion of the filter cake. It has been observed that the above-mentioned basic lead salts are preferentially wetted by plasticizer vehicles, even in the absence of any wetting agent.

The plasticizers that may be employed in this process include all of the ordinary ether- and ester-type plasticizers, but particularly preferred are the esters or polyesters of phthalic acid. Examples of such plasticizers include dicapryl phthalate, diisooctyl phthalate, and di-2-ethylhexyl phthalate. Other useful plasticizers include polyester adipate, polyglycols, triphenyl phosphite, bis(2-ethylhexyl)-2-ethylhexyl phosphonate, etc. While it is preferred that the vehicle be a plasticizer, it is of course possible to employ other organic dispersing media, provided they are not such as to adversely affect the characteristics of the composition with respect to its intended use. Among such other organic vehicles may be mentioned hydrocarbons such as mineral oil, petroleum jelly and the like.

The lead salts operable according to the present process are the basic soaps of fatty acids having 6 to 22 carbon atoms. Typical of the lead compounds within the class are the basic lead salts of caproic acid, caprylic acid, 2-ethylhexoic acid, lauric acid, capric acid, palmitic acid, undecylic acid, stearic acid and behenic acid.

The basic lead salts of acids containing less than 6 or more than 22 carbon atoms, however, are not readily dispersed in the organic media, and attempts to use them in the process of this invention result in emulsification or failure of the phase transfer, or both, either eventuality resulting in failure to form a distinct, separable water phase.

Within the carbon-chain range above specified, the basic lead salts of the relatively short-chain acids appear to be the most easily dispersed. When using basic lead salts of these short-chain acids, say from about 6 to about 16 carbon atoms, the phase transfer takes place rapidly and without difficulty at room temperature. The basic lead salts of the longer-chain acids, containing from about 18 to 22 carbon atoms, are less easily dispersed, and it may be desirable in some cases to assist the transfer by raising the temperatures of the charge, for example to about 50–90° C. and/or by adding to the charge a small amount (for example about 2 to 5 percent by weight of the organic vehicle) of an aliphatic alcohol, such as ethyl, propyl, isopropyl, butyl, isobutyl, hexyl, heptyl or octyl alcohol or the like.

The type of mixing apparatus to be employed in practicing the foregoing process is not critical. Any mixing means which produces a thorough blending action will facilitate the phase transfer of the filter cake solids to the liquid organic vehicle phase. It has been found convenient to employ a vibratory mixing apparatus which vibrates a closed vessel containing the materials to be mixed. Such mixers are commonly employed by paint vendors for mixing paints. In lieu of the vibratory mixer, a Baker-Perkins mixer having a kneading action may be employed. Employing such mechanical mixers, the process of this invention is capable of separating up to 90% and sometimes more of the water originally present in the filter cake. If it is desirable to reduce the moisture content of the plasticizer paste produced in the mechanical mixer, it is a simple matter to couple the mixer with a vacuum apparatus and to gently heat the paste until all but traces of water are driven off.

The time of mixing also is not critical and can be determined from the degree of dispersion of the filter cake solids in the plasticizer phase. With vibrating mixers operating at 200–250 cycles per minute, 15 minutes of mixing will usually produce a complete phase transfer of the solid materials.

The following examples illustrate the practice of the invention:

Example I 150 lbs. of a filter cake comprising approximately 60% water and the remainder the mixed dibasic lead soaps of hydrogenated tallow fatty acids (principally dibasic lead stearate, dibasic lead palmitate, and dibasic lead myristate) were mixed in a 30-gallon Baker-Perkins mixer for 30 minutes with 32.3 lb. of hexyl isodecyl phthalate. The phase transfer was substantially complete and 84.5% of the water contained in the system was decanted off at the termination of the mixing operation.

In contrast, a similar system containing tribasic lead sulfate in place of the dibasic lead soaps of fatty acids was emulsified, thereby preventing dispersion of the tribasic lead sulfate in the plasticizer. At the termination of the mixing operation, the batch failed to develop a separated water phase.

Example II 55.0 grams of a filter cake comprising approximately 43% water and the remainder the dibasic lead soaps of coconut oil fatty acids (principally dibasic lead laurate, caprate and caprylate) were placed in a vibrating mixer with 14.8 grams of hexyl isodecyl phthalate and shaken for 15 minutes at 200 cycles per minute. At the end of the mixing step, 80% of the water originally contained in the system was decanted off the plasticizer paste.

A similar system containing dibasic lead phosphite in place of the coconut oil fatty acid soaps emulsified during the mixing operation. There was no phase transfer of the filter cake solids and no water could be separated from the other components of the system.

Systems similar to the above but alternately employing equivalent amounts of the dibasic lead salts of propionic acid, butyric acid, adipic acid and azelaic acid did not result in a phase transfer of the filter cake solids and did not produce any separation of the aqueous phase of the system.

Example III 60 grams of dibasic lead behenate filter cake containing 52.7% water was placed in a vibrating mixer with 15.2 grams of di-2-ethylhexyl phthalate. After 15 minutes agitation at about 200 cycles per minute on the mixer, there was a complete dispersion of the solids in the plasticizer phase and 90% of the water content of the system was decanted off.

A similar system employing dicapryl phthalate as the plasticizer successfully dispersed the dibasic lead behenate solids in the plasticizer phase in approximately the same mixing time.

Another similar system employing diisooctyl phthalate as the plasticizer dispersed the lead salt solids in the plasticizer phase under the same conditions.

Example IV 80 grams of dibasic lead oleate filter cake containing approximately 65.7 grams of water and 14.3 grams of dibasic lead oleate were agitated for 15 minutes at about 200 cycles per minute on the vibrating mixer, with 14.8 grams of hexyl isodecyl phthalate. At the end of the agitation cycle, the dibasic lead oleate was found to have been well dispersed in the phthalate plasticizer, and the water portion of the filter cake had formed a clear separate phase. 92.5% of the water originally present was decanted off.

It is evident from the foregoing description and examples that basic lead salts of fatty acids having from 6 to 22 carbon atoms may be transferred from an aqueous phase to an organic vehicle phase by simple mixing, without necessitating the presence of additional wetting or surface-active agents. The pastes produced are stable for extended periods of time, some having remained on the shelf as long as two years without apparent change.

While the compositions of this invention are particularly useful as stabilizing and plasticizing agents for resinous compositions, many of them are useful for other purposes also. Thus, flushed pastes of dibasic lead stearate in mineral oil form excellent lubricating compositions.

The foregoing description and detailed examples of the invention are for the purposes of illustration and no undue limitations should be deduced therefrom.

We claim:

1. A process for preparing a flushed paste having heat stabilizing properties for resinous compositions which comprises agitating an aqueous filter cake consisting essentially of a basic lead salt of a fatty acid having from 6 to 22 carbon atoms and water with a neutral, water-immiscible liquid organic vehicle in amount sufficient to permit complete dispersion of the solid portion of said filter cake in said vehicle, thereby dispersing said basic lead salt in said organic vehicle, and separating the water portion of said aqueous filter cake from said organic vehicle and said basic lead salt therein dispersed.

2. A process according to claim 1, wherein said basic lead salt is a basic lead salt of a fatty acid having between 6 and 16 carbon atoms.

3. A process for preparing a flushed paste having heat stabilizing and plasticizing properties for resinous compositions which comprises agitating an aqueous filter cake consisting essentially of a basic lead salt of a fatty acid having from 6 to 22 carbon atoms and water with a neutral, water-immiscible liquid organic plasticizer selected from the group consisting of ester and ether type plasticizers, said plasticizer being present in amount sufficient to permit complete dispersion of the solid portion of said filter cake in said plasticizer, thereby dispersing said lead salt in said plasticizer, and separating the water portion of said aqueous filter cake from said organic plasticizer and said basic lead salt therein dispersed.

4. A process for preparing a flushed paste having heat stabilizing properties for resinous compositions which comprises agitating an aqueous filter cake consisting essentially of a basic lead salt of a fatty acid having from 6 to 22 carbon atoms and water with an organic vehicle and a small proportion of an aliphatic alcohol having from 3 to 8 carbon atoms, thereby dispersing said basic lead salt in said organic vehicle, and separating the water portion of said aqueous filter cake from said organic vehicle and said basic lead salt therein dispersed.

5. A process for preparing a flushed paste having heat stabilizing properties for resinous compositions which comprises agitating an aqueous filter cake consisting essentially of a basic lead salt of a fatty acid having from 6 to 22 carbon atoms and water with an organic vehicle, said agitation being carried out at elevated temperature, thereby dispersing said basic lead salt in said organic vehicle, and separating the water portion of said aqueous filter cake from said organic vehicle and said basic lead salt therein dispersed.

References Cited in the file of this patent

UNITED STATES PATENTS

| | | |
|---|---|---|
| 320,887 | Pulsifer | June 23, 1885 |
| 1,084,361 | Ramage | Jan. 13, 1914 |
| 1,192,163 | Brown | July 25, 1916 |
| 1,832,476 | Broeker | Nov. 17, 1931 |

FOREIGN PATENTS

| | | |
|---|---|---|
| 252,756 | Great Britain | June 2, 1926 |
| 305,160 | Canada | Oct. 28, 1930 |
| 469,559 | Great Britain | July 27, 1937 |
| 849,675 | France | Nov. 29, 1939 |

OTHER REFERENCES

Parle: "Official Digest of the Paint and Varnish Production Clubs" (Sept. 1949), pages, 606–609.